United States Patent [19]
Killer

[11] Patent Number: 5,647,803
[45] Date of Patent: Jul. 15, 1997

[54] THREAD CUTTING DEVICE

[76] Inventor: Lawrence Killer, 406 - 1980 Pandosy Street, Kelowna, British Columbia, Canada, V1Y 1S1

[21] Appl. No.: 471,415

[22] Filed: Jun. 6, 1995

[30] Foreign Application Priority Data

Sep. 9, 1994 [CA] Canada .................... 2132357

[51] Int. Cl.$^6$ ................................. B21H 3/02
[52] U.S. Cl. ............................ 470/67; 82/56
[58] Field of Search .................. 470/66, 67, 70, 470/80, 81, 183, 185, 186, 187, 190; 30/94–96, 102; 82/54, 56

[56] References Cited

U.S. PATENT DOCUMENTS

| | | | |
|---|---|---|---|
| 2,350,700 | 6/1944 | Segeberg | 30/102 |
| 3,601,892 | 8/1971 | Frank | 30/94 |
| 4,426,178 | 1/1984 | Wuchner | 470/67 |
| 5,315,759 | 5/1994 | Mashata | 30/102 |

*Primary Examiner*—Lowell A. Larson
*Assistant Examiner*—Thomas C. Schoeffler
*Attorney, Agent, or Firm*—Bishop & Company

[57] ABSTRACT

A device for cutting threads into an unthreaded end of a shaft member has a cutting blade support member mountable on a first side of an elongate frame, an adjustably moveable shaft support mountable on a second end of the elongate frame in opposed relation to the cutting blade support member, and means for adjustably moving the shaft support member between a shaft clamping position and a shaft releasing position. The cutting blade support member has cutting blades in radially spaced apart relation depending therefrom, the radially spaced arrangement so as to engage the cutting blades tangentially with a shaft held between the cutting blades and the shaft supporting member when the shaft supporting member is in the shaft clamping position. The elongate frame rigidly supports the cutting blade support member and the shaft support member in opposed relation when the shaft is clamped therebetween.

3 Claims, 2 Drawing Sheets

5,647,803

THREAD CUTTING DEVICE

FIELD OF THE INVENTION

This device relates to the field of devices for cutting screw threads on shafts or tubular members and in particular to devices for clamping onto the ends of unthreaded shaft or pipe members whereby threads are engraved into the ends of such members by rotation of the device relative to the member and wherein such threading may be accomplished by hand.

BACKGROUND OF THE INVENTION

Plumbers and like tradesmen often have the need to couple shafts or tubular members by means of threaded coupling connectors or other such joining devices which are adapted to receive threaded male ends into receptive threaded female mating ends within the coupling connectors or such joining devices. However, when such tradesmen are working on the job-site and have to custom fit members such as metal pipes or rods, it is most convenient to cut such members to the desired size as the member is being fitted and then to continue on with the job without having to remove the cut member for threading by prior art devices at a remote location.

Presently Applicant is aware of a standard thread chaser which comprises a threaded nut that is forced onto the unthreaded end of a cut tubular member by rotating the nut onto the end of the tubular member. This method has been found to be slow and generally unsatisfactory in light of the present invention, the embodiment of which disclosed herein having the object of providing an adjustable clamping device for clamping over the end of a shaft, pipe, rod or like member so as to clamp the end of the member between thread cutting blades and opposed support rollers, the adjustable clamp being adjustable to force the rollers against a first side of the member opposed to the side against which the thread cutting blades are brought to bear.

It is a further object of the present invention to provide a device in which the thread cutting blades are interchangeable with other thread cutting blades shaped to conformally fit around the circumference of different diameter shaft, pipe or rod members (hereinafter "shaft member" or "shaft" refer generically to shafts, rods, pipes, tubes and the like) and wherein the thread cutting blades are supported by a bracket mounted to the clamp and supported so as to bear against portions of the shaft member in a circumference around the surface of the shaft member.

Applicant is aware of a device for cleaning the threads of bolts manufactured by Noga Engineering Ltd. and marketed under the trade-mark Nes1. The Nes1 has a bolt supporting arm and adjustable jaws from which depend a pair of blades such that when the jaws are adjusted so as to tighten the blades down onto the threads of a bolt held on the supporting arm, rotating the Nes1 relative to the bolt drags the blade tips through the thread furrows thereby cleaning the threads of the bolt. What is not taught nor suggested in the Nes1 device is positioning cutting blades around the circumference of an unthreaded shaft member so as to thereby securely support an unthreaded shaft member between the circumferentially spaced cutting blades thus allowing cutting of threads into the shaft member rotationally supported within the clamping device.

SUMMARY OF THE INVENTION

A device for cutting threads into an unthreaded end of a shaft member has a cutting blade support member mountable on a first side of an elongate frame, an adjustably moveable shaft support mountable on a second end of the elongate frame in opposed relation to the cutting blade support member, and means for adjustably moving the shaft support member between a shaft clamping position and a shaft releasing position.

The cutting blade support member has cutting blades in radially spaced apart relation depending therefrom, the radially spaced arrangement so as to engage the cutting blades tangentially with a shaft held between the cutting blades and the shaft supporting member when the shaft supporting member is in the shaft clamping position.

The elongate flame rigidly supports the cutting blade support member and the shaft support member in opposed relation when the shaft is clamped therebetween.

The shaft support member further has rotatably mounted rollers rotatably mounted thereon so as to support a shaft on the rotatably mounted rollers to thereby facilitate rotation of the shaft against the cutting blades when the shaft support member is in the shaft clamping position.

The cutting blade support member is rotatably mounted to the elongate frame.

DETAILED DESCRIPTION OF THE PREFERRED EMBODIMENT

Figure 1:
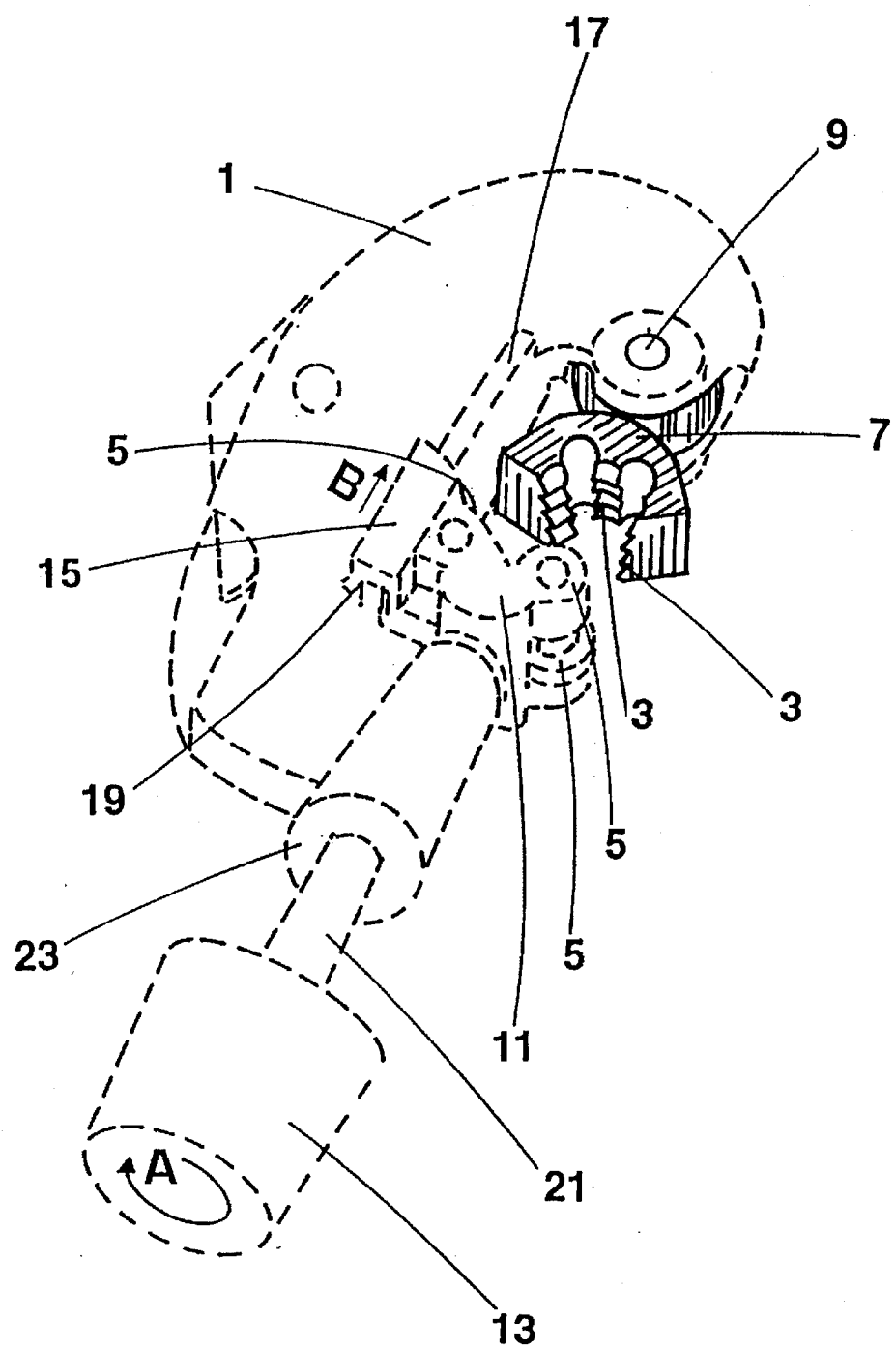
FIGS. 1 and 2 are perspective views of a thread cutting device for shaft members according to the present invention.

As illustrated in FIG. 1, a device according to the present invention includes a clamping member such as "C"-clamp 1 supporting in opposed relation cutting blades 3 and shaft supporting rollers 5.

Cutting blades 3 are supported by cutting blade support member 7 which may be rotatably mounted to C-clamp 1 at pivot 9.

Shaft support rollers 5 are rotatably supported on roller support member 11. The position of roller support member 11 relative to cutting blades 3 on cutting blade support member 7 may be adjusted so as to clamp a shaft end between cutting blades 3 and shaft support rollers 5 by rotating knob 13 in direction A to thereby advance roller support member 11 in direction B. Roller support member 11 may have mounted thereto tracking guide member 15 for guiding roller support member 11 longitudinally in direction B along track 17, track 17 snugly sliding within channel 19 in tracking guide member 15.

The longitudinal advancement of roller support member 11 in direction B by means of rotating knob 13 in direction A is accomplished by threaded rod 21 (threads illustrated in FIG. 2) journalled in threaded engagement through collar 23.

Figure 2:
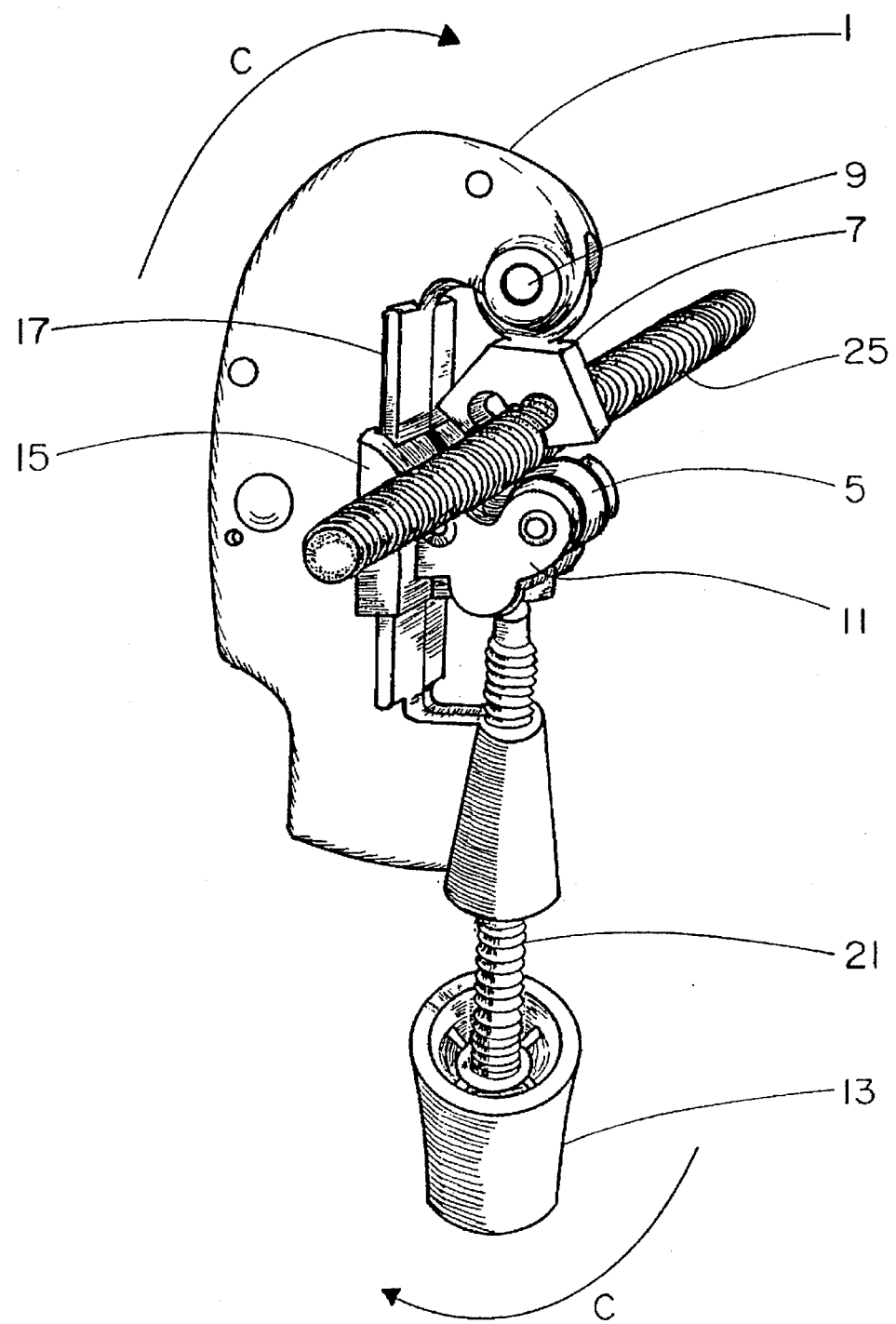

Cutting blade support member 7 is hemispherically shaped so as to support three or more sets of cutting blades 3 in radially spaced apart relation around the outer circumference of a shaft member 25 (shown already threaded in FIG. 2) clamped between cutting blades 3 and shaft support rollers 5. Each set of cutting blades 3 may be an array of saw-tooth shaped blades forming a spaced apart array of blades in the direction of shaft 25. Cutting blades 3 are arranged on cutting blade support member 7 so as to engage, laterally across shaft 25, the tips of cutting blades 3 substantially tangentially to the surface of a shaft clamped between cutting blades 3 and shaft support rollers 5. Cutting blades 3 are themselves aligned in relation to one another so as to cut a conventional thread pattern into shaft 25 by the action of rotating shaft 25 relative to cutting blades 3, such as illustrated in FIG. 2, when the shaft member 25 is clamped between cutting blades 3 and shaft support rollers 5.

It has been found that a conventional pipe cutting tool may be modified by removing the cutting element and replacing the cutting element with cutting blade support member 7 having cutting blades 3. Thus the C-clamp 1, shaft support rollers 5 on roller support member 11, and knob 13 for rotating threaded rod 21 journalled in collar 23 so as to translate shaft support rollers 5 in direction B can be accomplished by such use of a modified conventional pipe cutting tool.

In the manner of using a conventional pipe cutting tool, in order to cut thread into the unthreaded end of a shaft, a conventional pipe cutting tool modified according to the present invention is clamped about the end of a shaft. Knob 13 is rotating in direction A so as to snug shaft support milers 5 against the shaft thereby bringing cutting blades 3 into engagement with the surface of the shaft to be threaded. C-clamp 1 is then rotated in direction C (see FIG. 2) relative to the shaft thereby causing cutting blades 3 to cut furrows into the end of the shaft so as to form threads.

To accommodate different sized shaft, pivot 9 may be a removable pin which, when removed, allows for interchanging of different cutting blade support members 7 having cutting blades 3 in differing spaced apart relation to accommodate different diameters of shaft.

In an alternative embodiment, shaft support rollers 5 could be mounted to C-clamp 1 so as to remain stationary relative to C-clamp 1 and cutting blade support member 7 having cutting blades 3 could be mounted to means for adjustably clamping a shaft between shaft support rollers 5 and cutting blades 3, such means being for example threaded rod 21 journalled in collar 23 as depicted mounted in opposed relation to that depicted.

As will be apparent to those skilled in the art in the light of the foregoing disclosure, many alterations and modifications are possible in the practice of this invention without departing from the spirit or scope thereof. For example, more than three sets of cutting blades 3 may be arranged in radially spaced apart relation on cutting blade support member 7. Also, the longitudinal position of support member 7 may be adjustable relative to a fixed shaft support 11. Further, C-clamp 1 may be any other rigid support frame such as a ring or oval shaped support member, or might be replaced with a bar clamp for example so long as a shaft may be clamped between, in opposed relation, cutting blades 3 and a shaft support. Accordingly, the scope of the invention is to be construed in accordance with the substance defined by the following claims.

What is claimed is:

1. A device for cutting threads into a shaft member comprising a cutting blade support member releasably mountable in a first plane on a first side of an elongate support frame lying generally in said first plane, a shaft member support mountable in said first plane on a second side of said elongate support frame in opposed relation to said cutting blade support member, adjustable clamping means mounted to said elongate support frame and co-operating with said cutting blade support and said shaft member support for relative clamping movement in said first plane of said cutting blade support and said shaft member support so as to clamp said shaft member between said cutting blade support member and said shaft member support and thereby align said shaft member in a second direction generally perpendicular to said first plane, said clamping means adjustably positionable in said first plane between a shaft member clamping position and a shaft member releasing position, said cutting blade support member comprising at least three sets of cutting blades depending therefrom in radially spaced apart relation, radially spaced apart in said first plane, said radially spaced apart relation of said sets of cutting blades radially spaced around a shaft member centroidal axis in said second direction so as to engage said sets of cutting blades substantially tangentially with a surface of said shaft member when said shaft member is clamped between said sets of cutting blades and said shaft member support when said clamping means is in said clamping position, said elongate support frame rigidly supporting said cutting blade support member and said shaft member support in opposed relation when said shaft member is clamped therebetween, whereby said shaft member may be rotated about said centroidal axis relative to said elongate support frame to cut thread into said surface of said shaft member, each of said at least three sets of cutting blades comprising a plurality of blades spaced apart in said second direction by a desired thread spacing and, so spaced apart, forming a spaced array of saw-tooth shaped blades spaced apart in said second direction for cutting said threads at a desired thread depth, said sets of cutting blades aligned in said second direction in relation to one another so as to cut said thread into said surface of said shaft member when said shaft member is rotated about said centroidal axis relative to said elongate support frame.

2. The device of claim 1 wherein said shaft member support further comprises rotatably mounted rollers rotatably mounted thereon so as to support said shaft member on said rotatably mounted rollers to thereby facilitate rotation of said shaft member against said sets of cutting blades when said clamping means is in said clamping position.

3. The device of claim 2 wherein said cutting blade support member is rotatably releasably mountable to said elongate support frame.

* * * * *